(12) United States Patent
Hazard et al.

(10) Patent No.: US 8,916,046 B2
(45) Date of Patent: Dec. 23, 2014

(54) METHOD FOR CONTROLLING OXYGEN SUPPLY FOR TREATING WASTEWATER, AND FACILITY FOR IMPLEMENTING SAME

(75) Inventors: Jean-Pierre Hazard, Paris (FR); Patrick Descamps, Marly le Roi (FR)

(73) Assignee: Degremont (FR)

( * ) Notice: Subject to any disclaimer, the term of this patent is extended or adjusted under 35 U.S.C. 154(b) by 492 days.

(21) Appl. No.: 13/256,450

(22) PCT Filed: Mar. 16, 2010

(86) PCT No.: PCT/IB2010/051125
§ 371 (c)(1),
(2), (4) Date: Sep. 14, 2011

(87) PCT Pub. No.: WO2010/106487
PCT Pub. Date: Sep. 23, 2010

(65) Prior Publication Data
US 2012/0006414 A1  Jan. 12, 2012

(30) Foreign Application Priority Data
Mar. 17, 2009 (FR) ...................................... 09 01232

(51) Int. Cl.
*C02F 3/02* (2006.01)
*C02F 3/12* (2006.01)
*C02F 3/00* (2006.01)
*C02F 3/30* (2006.01)

(52) U.S. Cl.
CPC .................. *C02F 3/006* (2013.01); *C02F 3/302* (2013.01); *C02F 2209/44* (2013.01); *C02F 2209/14* (2013.01); *C02F 2209/16* (2013.01); *C02F 2209/003* (2013.01); *C02F 3/1257* (2013.01); *C02F 2209/15* (2013.01); *C02F 2209/22* (2013.01); *Y10S 210/903* (2013.01)
USPC ........ 210/605; 210/614; 210/630; 210/221.2; 210/259; 210/903

(58) Field of Classification Search
CPC .. C02F 3/006; C02F 2209/16; C02F 2209/14; C02F 2209/15; C02F 2209/003; C02F 3/1257; C02F 3/302; C02F 2209/22; C02F 2209/44
USPC ................. 210/605, 614, 620, 630, 143, 220, 210/221.2, 252, 259, 903
See application file for complete search history.

(56) References Cited

U.S. PATENT DOCUMENTS

| 7,416,669 | B1 | 8/2008 | Carolan et al. | |
| 8,323,498 | B2 * | 12/2012 | Jenkins et al. | ................ 210/614 |
| 2006/0283794 | A1 | 12/2006 | Oger et al. | |

FOREIGN PATENT DOCUMENTS

| FR | 2 858 609 A1 | 2/2005 |
| JP | 2006 055683 A | 3/2006 |

*Primary Examiner* — Fred Prince
(74) *Attorney, Agent, or Firm* — The Belles Group, P.C.

(57) ABSTRACT

The invention relates to a method for controlling oxygen supply in a tank (2) for biologically treating wastewater by alternating aeration including consecutive cycles, wherein each cycle comprises a first aeration phase and a second anoxic phase for reducing nitrites and nitrates formed during the preceding aeration phase, the tank is provided with sensors for measuring ammonia nitrogen (4b) and for measuring nitrate (4c) and optionally for measuring oxygen (4a) that is dissolved in the tank liquor or in the liquor thereof exiting the tank, a method according to which the oxygen supply is controlled in the aeration phase when the reduction speed of the nitrate measurement is less than a bottom threshold and the cutoff of the oxygen supply is also controlled in the aeration phase when at least one of the following triggering events occurs: the reduction speed in the measurement of ammonia nitrogen becomes lower than a bottom threshold; the total sum of ammonia nitrogen and nitrate measurements becomes higher than a top threshold, said thresholds may be dependent on time delays and on a top threshold for the dissolved oxygen measurement.

11 Claims, 3 Drawing Sheets

METHOD FOR CONTROLLING OXYGEN SUPPLY FOR TREATING WASTEWATER, AND FACILITY FOR IMPLEMENTING SAME

PRIORITY

Priority is claimed as a national stage application, under 35 U.S.C. §371, to PCT/IB2010/051125, filed Mar. 16, 2010, which claims priority to French application 0901232, filed Mar. 17, 2009. The disclosures of the aforementioned priority applications are incorporated herein by reference in their entirety.

The present invention relates to the biological treatment of wastewater containing nitrogenous pollution in reduced form, in particular ammoniacal nitrogen, treated by a method of alternating aeration for nitrification/denitrification in one and the same aeration basin.

More precisely, the invention relates to a method of regulating the oxygen supply into a basin for the biological treatment of wastewater by alternating aeration comprising successive cycles, each cycle comprising an aeration first phase, for oxidizing especially the carbon and nitrogen compounds using aerobic bacteria, and an anoxic second phase, for reducing the nitrites and nitrates formed during the preceding aeration phase.

In the prior art, the basin is equipped with dissolved-oxygen measurement and/or redox potential sensors, in which method the supply of oxygen in the aeration phase is stopped when at least:
the dissolved-oxygen measurement exceeds a high threshold; or
the redox potential exceeds a high threshold.

A method of this kind is known in particular from "Memento Technique de l'Eau", Degremont Suez, $10^{th}$ edition, Volume 2, in particular pages 914 and 915.

In this known method, the amount of oxygen supplied during the aeration first phase may be set or regulated according to known principles as a function of a measurement or a combination of measurements of the amount of dissolved-oxygen, the redox potential or the pollution entering the aeration basin, such as the COD or the ammoniacal nitrogen content. The end of this aeration phase is determined by known devices involving a measurement or a combination of measurements of the redox potential, dissolved-oxygen and time. For example, the supply of oxygen may be stopped when the aeration time reaches a maximum limit value or when the measurement of the redox potential in the aeration basin exceeds a high threshold after a certain time, provided that the duration of the aeration phase has reached a minimum time.

After this aeration phase, the anoxic second phase serves to reduce the nitrites and nitrates formed during the preceding aeration phase. The bacteria then use mainly the carbon provided by the raw water. The end of this anoxic phase is determined by known devices involving a measurement or a combination of measurements of the redox potential and time. For example, the supply of oxygen may be resumed when the anoxia time reaches a maximum limit value, or when the measurement of the redox potential in the aeration basin drops below a low threshold, provided that the duration of the anoxia phase has reached a minimum time.

However, these methods of regulating the oxygen supply that are based on redox potential and dissolved-oxygen measurements are subject to drift, mainly because of:
firstly, the difficulty of maintaining the redox potential measurement probes, which are sensitive to certain chemical compounds present in the water; and
secondly, the approximate representation of the nitrification and denitrification reactions.

The regulating methods are also generally provided with minimum and maximum time delays of the aeration and anoxia phases, together with the possibility of managing the aeration phases, the anoxia phases and the amount of air in the aeration phases as a function of the actual time elapsed instead of redox-potential and dissolved-oxygen measurements, by being based on the fact that the amount of pollution to be treated varies over the course of the day depending on what time it is.

These various time-based "safeguards" make it possible to maintain the proper operation of the biological reactions, but they often mean that the regulating parameters have to be checked as a security measure, thereby very often involving poorly optimized energy consumption.

The aim of the invention is therefore, taking into account this prior art, to provide a method of regulating the oxygen supply that enables the consumed energy to be optimized in a lasting development approach, while improving the treatment.

The $NH_4$ and $NO_3$ sensors are more representative of the chemical reactions involved in the removal of the nitrogenous pollution than oxygen and redox sensors since the chemical parameters resulting from the biological reactions are measured directly.

Certain authors have suggested using continuous regulation algorithms based on $NH_4$ and $NO_3$ measurements, thereby requiring a continuously variable amount of oxygen to be injected into the aeration basin. This type of continuous regulation requires equipment for generating air at a variable flow or equipment for continuously regulating the flow rate, the cost and operating difficulty of which may be incompatible with the small size of a biological treatment plant based on sequence aeration.

In the sequenced aeration method, the nitrification and the denitrification take place in succession in the same basin:
the nitrification can be described by the following overall chemical reaction in the presence of a supply of oxygen into the medium:

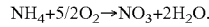
$$NH_4 + 5/2 O_2 \rightarrow NO_3 + 2H_2O.$$

The reaction is terminated when all the ammoniacal nitrogen is eliminated; in other words it is no longer necessary to inject oxygen when the $NH_4$ measurement is close to zero.

Certain authors (U.S. Pat. No. 7,416,669) have proposed automating the stoppage of oxygen injection into the basin when the ammoniacal nitrogen measurement is close to zero, optionally together with certain minimum or maximum stoppage time conditions;
The denitrification may be described by the following overall chemical equation when there is no dissolved oxygen in the liquid medium:

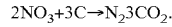
$$2NO_3 + 3C \rightarrow N_2 3CO_2.$$

The reaction is terminated when all the nitrate is eliminated. The bacteria then no longer have any oxygen available, and it is necessary to reoxygenate the medium to allow them to undergo respiration. In other words, it is necessary to inject oxygen when the $NO_3$ measurement is close to zero in order to avoid promoting the proliferation of bacteria that are inconducive to the settling or filtration step, such as filamentous bacteria.

Certain authors (U.S. Pat. No. 7,416,669) have suggested automating the resumption of oxygen injection into the basin when the nitrate measurement is close to zero, optionally together with certain minimum or maximum operating time conditions.

These means for making it possible to determine the moment when it is decided to start or stop the injection of oxygen into the aeration basin using low thresholds for the $NH_4$ or $NO_3$ measurements result in the operating conditions drifting over time, a consequence thereof being insufficient treatment or overconsumption of oxygen thereby increasing the energy consumed for the following reasons:

the ammoniacal nitrogen and nitrate measurements may drift by 1 mg/l or more in one direction or another in values close to zero. These errors may be due for example to:
 an accumulation of fibrous waste (tow) around the sensor
 deposits on the measurement cell
 a calibration drift
 a variation in chlorine concentration in the medium that falsifies the nitrate measurement
 a variation in potassium concentration in the medium that falsifies the ammoniacal nitrogen measurement
 aging of the probe;
when the measurement zero is above the actual concentration value, the low threshold is not always reached and the alternation of aeration and nonaeration phases does not take place correctly; and
when the measurement is below the actual concentration value, the low threshold of the measurement is reached prematurely and the method is not optimized;
For higher values however the drift of the $NH_4$ and $NO_3$ sensors is relatively small compared with the absolute measurement and the errors caused by this drift are generally acceptable in respect of the precision required for the treatment guarantees that are expressed as average values on leaving the plant.

The treatment guarantees are generally expressed as an overall nitrogen value (NGL) that represents the sum of all the nitrogen compounds contained in the treated water, whether they are in reduced form (ammoniacal nitrogen or organic nitrogen) or in oxidized form (nitrates or nitrites).

It is therefore unnecessary to take into account the high thresholds of the individual measurements of each of these compounds in order to control the injection or stoppage of oxygen into the aeration basin, but rather the sum of the measurement compounds.

Moreover, it has been found that the sum of the measured nitrogen compounds reaches its maximum after a long period of aeration and therefore, for providing a better treatment guarantee, the high threshold of the $N-NH_4+N-NO_3$ sum is relevant for stopping the supply of air into the aeration basin.

The object of the invention is in particular to detect the end of the nitrification and denitrification reactions by observing a significant change in the slope of the $NH_4$ or $NO_3$ measurements according to whether the oxygen supply into the medium is zero or constant.

According to the invention, a method of regulating the oxygen supply into a biological wastewater treatment basin by alternating aeration comprising successive cycles, each cycle comprising an aeration first phase, for oxidizing especially the carbon and nitrogen compounds using aerobic bacteria, and an anoxic second phase, for reducing the nitrites and nitrates formed during the preceding aeration phase, is characterized in that:
 at least one ammoniacal nitrogen measurement sensor and one nitrate measurement sensor are provided in the liquor of the basin or in the liquor that leaves the basin;
 a supply of oxygen in the aeration phase is actuated on the basis of the following event:
  the rate of decrease of the nitrate measurement drops below a low threshold; and
 the supply of oxygen in the aeration phase is stopped when at least one of the following triggering events occurs:
  the rate of decrease of the ammoniacal nitrogen measurement drops below a low threshold;
  the sum of the ammoniacal nitrogen and nitrate measurements exceeds a high threshold.

Implementing this method has given good results provided that the amount of oxygen supplied into the aeration basin is sufficient to ensure nitrogen nitrification and endogenous bacterial respiration.

However, it may happen that, at certain periods, the oxygen supply becomes insufficient when faced with a massive influx of pollution. This may be the case, for example, during the peak period of a plant during an influx of industrial effluent, or at the start of a rainy period when the effluent brings in additional pollution by flushing of the drains. The oxygen supply is then the factor that limits nitrification and therefore there is a slight decrease in the ammoniacal nitrogen measurement, or even sometimes an increase in the ammoniacal nitrogen measurement and a very low, or even zero, residual dissolved-oxygen measurement. The oxygen supplied into the medium is preferentially captured by the bacteria.

As a consequence, if the dissolved-oxygen measurement is insufficient, for example 1 to 2 mg/l, the supply of air must not be stopped by the sole fact that the ammoniacal nitrogen has decreased to below a low threshold.

Optionally, according to the invention:
in addition to the ammoniacal nitrogen and nitrate measurement sensors, at least one dissolved-oxygen measurement sensor is provided; and
the supply of oxygen in the aeration phase is stopped when at least one of the following triggering events occurs:
the rate of decrease of ammoniacal nitrogen measurement drops below a low threshold and the dissolved-oxygen measurement exceeds a high threshold;
the sum of the ammoniacal and nitrate measurements exceeds a high threshold.

The oxygen supply is thus automated according to the decrease in the continuous ammoniacal nitrogen and nitrate concentration measurements and as a function of the sum of these measurements and optionally of a dissolved-oxygen measurement. As a result, the aeration is better adapted to the requirements, the supply of oxygen is reduced and there is an energy saving. The nitrification and denitrification treatments are also improved.

Advantageously, the low threshold for the rate of decrease of the nitrate measurement controlling the onset of oxygen supply into the aeration basin is less than 1 mg/l/h, for example less than 0.5 mg/l/h, preferably after more than a certain time, for example in particular after more than 10 minutes.

Preferably, the oxygen supply is stopped when one of the following events occurs:
the decrease in the ammoniacal nitrogen measurement in the aeration basin is less than 1 mg/l/h, for example less than 0.5 mg/l/h, preferably after more than a certain time, for example in particular after more than 10 minutes; and
the sum of the nitrate and ammoniacal nitrogen measurements exceeds a high threshold that depends on the treatment guarantees in terms of overall nitrogen, for example 10 mg/l.

The triggering or operating events may be delayed in such a way that if the threshold corresponding to an event is violated after a certain time, the oxygen supply is stopped or actuated without any other condition.

The amount of oxygen supplied into the aeration basin during the nitrification phase may be constant if the oxygenation means are unable to modify it. Otherwise, it is advantageous to be able to modify the flow rate of oxygen transferred into the aeration basin according to the ammoniacal nitrogen and/or nitrate measurements, in particular a threshold violation or a change of slope of the representative curve.

Preferably, the amount of oxygen supplied into the aeration basin during a nitrification phase is determined according to the amount of incoming pollution.

In the absence of direct measurement of the incoming pollution by one or more sensors dedicated for this purpose, the incoming pollution may be based on that during the preceding denitrification phase that is estimated from the slope of the rise of the ammoniacal nitrogen measurement over all or part of the preceding anoxic phase.

In certain cases, in particular during periods of high incoming pollution, the flow of oxygen injected into the basin corresponds to the nominal design throughput of the plant until the decrease in the ammoniacal nitrogen measurement is below a low threshold, in particular 0.5 mg/l/h. From that moment on, the flow of injected oxygen may be reduced to a value proportional to the incoming pollution.

In certain other cases, in particular during periods of low incoming pollution, the flow of oxygen injected into the basin may be advantageously a value proportional to the incoming pollution, i.e. proportional to the slope of the rise of the ammoniacal nitrogen measurement over all or part of the preceding anoxia period.

Thus, the energy needed to supply oxygen into the basin corresponds to the value just necessary for eliminating the carbon and nitrogen pollution to be treated, even if the dissolved oxygen remains at a low, or even zero, value.

The oxygen may be supplied into the aeration basin sequentially or continuously during the nitrification phase, whether this is in the form of atmospheric or oxygen-enriched air or in the form of pure oxygen or in the form of a fluid containing dissolved oxygen, or else by any other stirring means that introduces air and/or oxygen into the fluid.

The ammoniacal nitrogen measurement and/or nitrate sensors may be placed in the aeration basin so as to measure the nitrogen compounds in the liquor of the aeration basin itself. According to another possibility, the ammoniacal nitrogen measurement and/or nitrate sensors are placed so as to measure the nitrogen compounds in the liquor leaving the aeration basin or in a sample of the liquor taken from the aeration basin.

The invention also relates to a plant for implementing the method defined above, this plant comprising a basin for the biological treatment of wastewater by alternating aeration with successive cycles, each cycle comprising an aeration first phase and an anoxic second phase, and being characterized in that it comprises:

at least one ammoniacal nitrogen measurement sensor and one nitrate sensor of the liquor in the basin or outside the basin; and an oxygen supply control means which is connected to the sensors so as to:

turn on the oxygen supply in the aeration phase on the basis of the following optionally delayed event:

the rate of decrease of the nitrate measurement drops below a low threshold, in particular less that 0.5 mg/l/h after more than 10 minutes;

stop the supply of oxygen in the aeration phase when at least one of the following, optionally delayed, events occurs:

the rate of decrease of the ammoniacal nitrogen measurement drops below a low threshold;

the sum of the ammoniacal nitrogen and nitrate measurements exceeds a high threshold.

The plant may comprise, in addition to the ammoniacal nitrogen measurement and nitrate sensors, at least one dissolved-oxygen measurement sensor; and the oxygen supply control means is connected to the sensors in order to stop the supply of oxygen in the aeration phase when at least one of the following, optionally delayed, events occurs:

the rate of decrease of the ammoniacal nitrogen measurement drops below a low threshold and the dissolved-oxygen measurement exceeds a high threshold;

the sum of the ammoniacal nitrogen and nitrate measurements exceeds a high threshold.

The invention consists, apart from the arrangements presented above, of a number of other arrangements which will be more explicitly explained below with regard to an exemplary embodiment described with reference to the appended drawings, but this is in no way limiting. In these drawings:

FIG. 1 is a schematic plan view of a basin for the biological treatment of wastewater by alternating aeration according to the invention;

FIG. 2 is a diagram illustrating, as a function of time plotted on the x-axis, the curves, compared over 24 hours, of the variations, plotted on the y-axis, of the redox potential, the dissolved-oxygen content, the ammoniacal nitrogen (N—NH$_4$) content and the nitrate (N—NO$_3$) content of the liquor in a treatment basin according to a conventional method, the scales being shifted along the y-axis in order to make it easier to examine the diagram;

Figure 4:
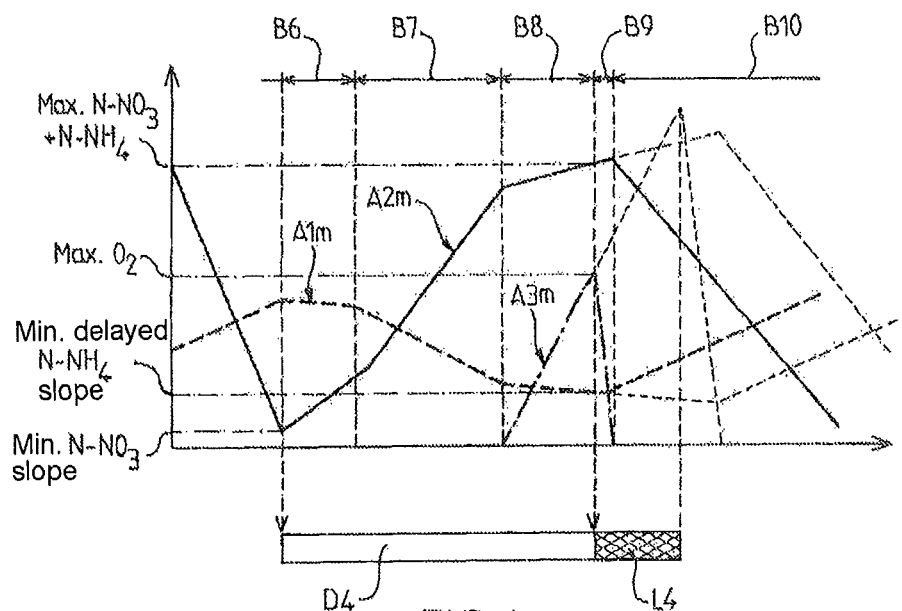
FIG. 4 is a diagram similar to that of FIG. 3 illustrating the method according to the invention when the flow of oxygen supplied is not variable.
Figure 5:
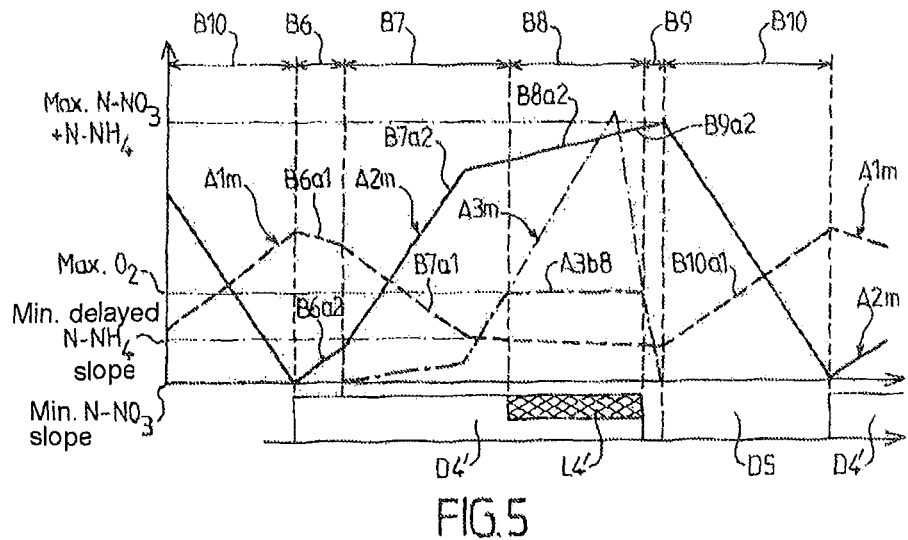
Figure 6:
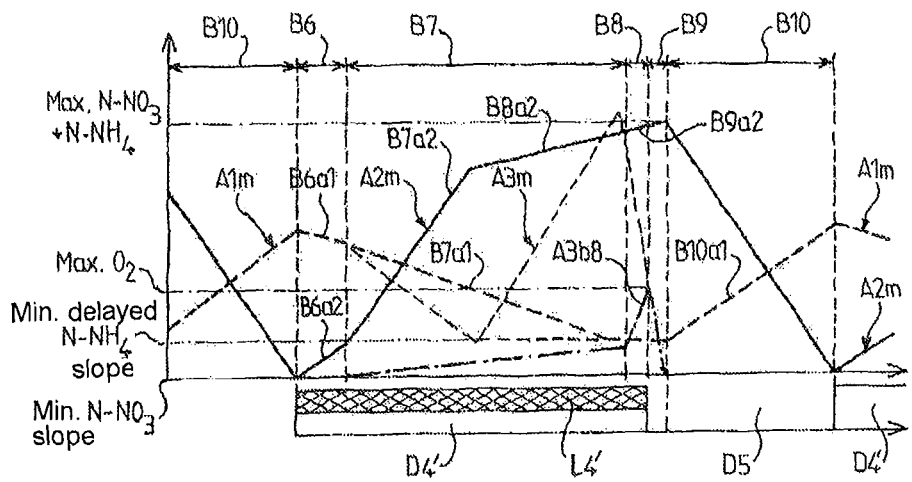

FIG. 5 is a diagram similar to FIG. 4 illustrating the method according to the invention when the flow of oxygen supplied is reduced over part of the cycle during which the ammoniacal nitrogen content is low, this being particularly preferred during periods of high incoming pollution; and FIG. 6 is a diagram similar to FIG. 5 illustrating the method according to the invention when the flow of oxygen supplied is modulated throughout the nitrification period, this being particularly preferred during periods of lower incoming pollution, generally at night time.

Figure 1:
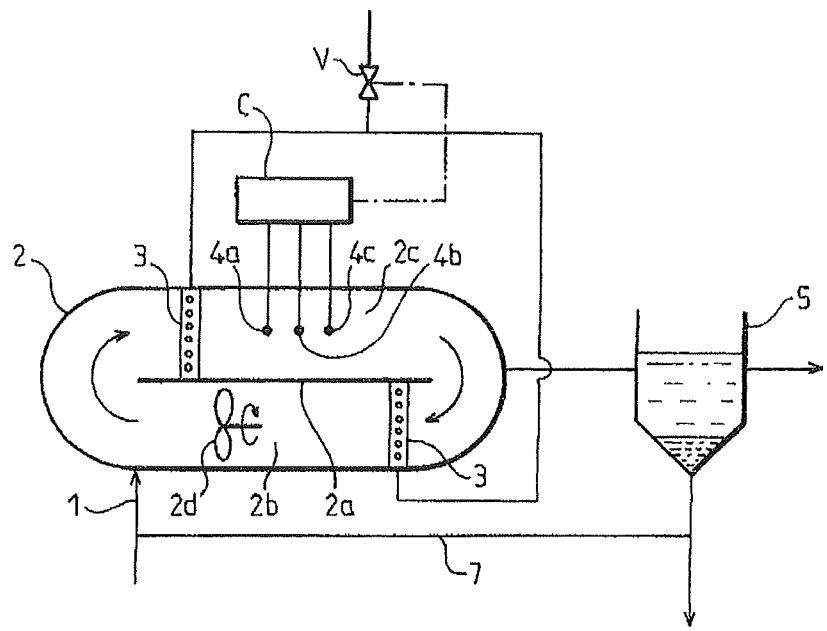

FIG. 1 illustrates a plant operating according to the biological process of alternating nitrification/denitrification of the invention, without this simple representation restricting the field of application of the invention. The pretreated raw water 1 is channeled into the aeration basin 2, which includes a central partition 2a that terminates at each end short of the wall of the basin. A circuit comprising two legs 2b, 2c surrounds the partition. At least one agitator 2d, especially a propeller agitator, is provided in the basin so as to make the liquor move around the partition 2a, as illustrated by the arrows.

The basin 2 is sequentially aerated by a supply of oxygen via injectors 3 crosswise in the bottom of the basin. The oxygen is supplied by means of known processes, such as the diffusion of oxygen or atmospheric air optionally enriched with oxygen, in dissolved form or in the form of large, medium-sized or small bubbles.

According to the invention, at least one sensor 4b or probe is provided for measuring the ammoniacal nitrogen content N—NH$_4$ and a sensor 4c or probe for measuring the nitrate content N—NO$_3$ of the liquor in the basin 2, or that leaving the basin. Optionally, the dissolved-oxygen content of the liquor in the basin, or that leaving the basin 2, is monitored by one or more sensors 4a. The time is also measured.

Advantageously, the sensors 4a, 4b and 4c are installed in the basin 2, in the same zone, for monitoring the supply of oxygen. As a variant, sensors may be installed outside the basin 2, before or after the settling/filtration unit 5, or measurements may be carried out on specimens of the liquor taken from the basin 2.

A nonlimiting example of a sensor for selective in-line measurement of the ammonium and nitrate ions is provided by the sensor sold under the name "VARION® sensor" by the German company Wissenschaftlich-Technische Werkstätten GmbH.

The liquor then enters a settling or filtration unit 5 that separates the treated water 6 from the sludge 7 which is recirculated into the aeration basin. In the schematic representation of FIG. 1, the unit 5 is shown in vertical cross section, whereas the basin 2 is seen from above.

Recordings were made on several sites equipped with ammoniacal nitrogen and nitrate measurement probes.

Figure 2:
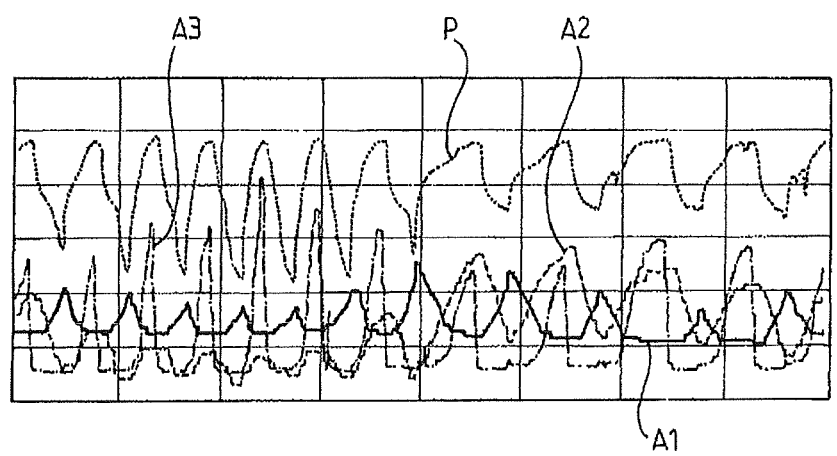

An example is illustrated by FIG. 2, which shows the curves, compared over 24 hours, of the measurements recorded by sensors installed in the same aeration basin. The comparative change of the following measurements were thus observed:

the redox potential, represented by a curve P;
the ammoniacal nitrogen content N—NH$_4$, represented by a curve A1;
the nitrate content N—NO$_3$, represented by a curve A2, and
the dissolved oxygen content, represented by a curve A3.

The scales on the y-axis have been shifted slightly so as to make examination easier.

In this example, FIG. 2 shows eleven aeration/anoxia cycles, the supply of oxygen during the aeration phase being provided by a constant flow of pressurized air, the start and end of each aeration period being automatically determined according to redox-potential and time thresholds.

It may be seen that the continuous measurements of the ammoniacal nitrogen and nitrate concentrations show that the redox-potential and dissolved-oxygen measurements are an imperfect representation of the variations in the alternating nitrification/denitrification phenomena.

During the aeration phase, a value of less than 1 mg/l of ammoniacal nitrogen is not always reached at the same redox potential value.

During the anoxia phase, the complete disappearance of nitrates occurs at the redox potential values that may be different over the course of the day.

During the aeration phase, the nitrification is capable of taking place as long as nitrogen is being supplied into the basin, even if the dissolved-oxygen measurement probe or sensor is indicating a zero value. The appearance of a high dissolved-oxygen measurement value occurs essentially when the rate of nitrification is low, thus resulting in a wasted expenditure of energy because of the unnecessary supply of oxygen.

During the anoxia phase, the denitrification does not start at the moment when the supply of oxygen is stopped, since nitrification continues if dissolved oxygen is present in the aeration basin.

Figure 3:
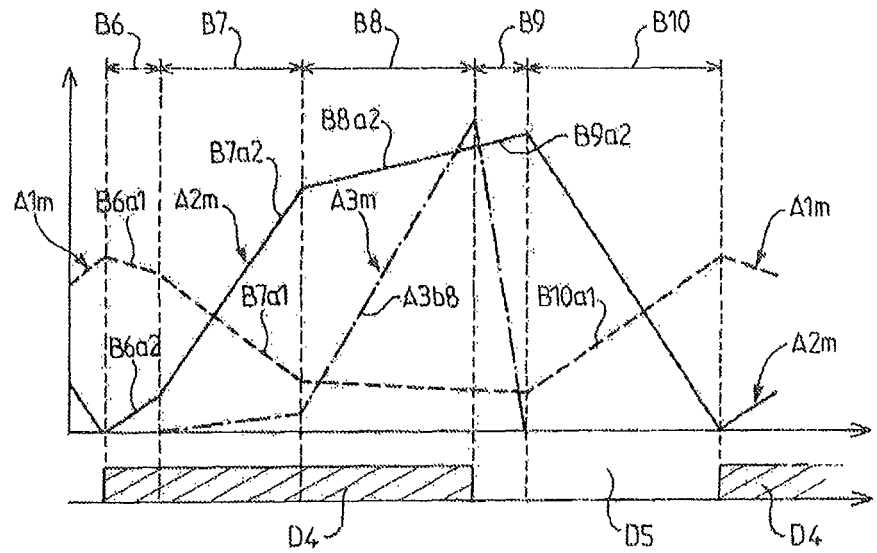
FIG. 3 illustrates a modeling of the measurement curves of FIG. 2 for a nitrification/denitrification cycle.

FIG. 3 illustrates a modeling of the measurement curves during an aeration/anoxia cycle according to a conventional process. Curves compared as a function of time are the measurements of:

the ammoniacal nitrogen content N—NH$_4$ represented by curve A1m;
the nitrate content represented by curve A2m; and
the dissolved oxygen content represented by curve A3m.

The sensors 4a, 4b and 4c are placed substantially at the same point in the biological aeration basin undergoing alternately a period D4 of supply with air at a constant flow rate and a period D5 of anoxia. The sum of the periods D4 and D5 may vary from about 1 hour to 4 hours.

As soon as air is supplied into the basin, the nitrification is observed in a subphase B6 by the downward slope B6a1 of the ammoniacal nitrogen measurement and the upward slope B6a2 of the nitrate measurement. During this first subphase, the carbonaceous and nitrogenous pollutions present in the basin are transformed despite a zero or substantially zero dissolved-oxygen measurement.

Since the flow rate of the supply of air remains unchanged, the nitrification is then observed in a subphase B7 at a higher rate. During this second subphase B7, the carbonaceous pollution accumulated in the basin during the preceding anoxic phase has practically disappeared and the nitrification yield is higher despite a dissolved-oxygen measurement close to zero. The downward slope B7a1 of the ammoniacal nitrogen measurement and the upward slope B7a2 of the nitrate measurement are higher than in B6.

The third subphase B8 is observed when the slope of the ammoniacal nitrogen measurement is low, in particular when it is close to 0.5 mg/l/h. The nitrogenous pollution accumulated in the basin during the preceding anoxic phase has practically disappeared. The aeration serves only to eliminate the incoming pollution, which is the factor limiting the rate of nitrification.

For a lower amount of pollution to be eliminated, since the flow of air remains constant over the period D4, the dissolved-oxygen measurement increases considerably, as shown by the slope A3b8, thus resulting in a much higher ratio of the aeration energy to amount of pollution eliminated than during the preceding subphases.

The fourth subphase B9 corresponds to the start of the anoxia period D5. The supply of air is stopped, but the dissolved oxygen present in the basin continues the nitrification reaction at the same rate as in the preceding subphase B8 (the slope B9a2 is the same as the slope B8a2) although it would be expected to observe denitrification.

The denitrification fifth subphase B10 takes place only when all the dissolved oxygen has been consumed. Over this time, the ammoniacal nitrogen measurement B10a1 increases with the amount of pollution entering the aeration basin.

The primary objective of the invention is to limit the supply of oxygen into the aeration basin undergoing alternately nitrification and denitrification phases according to a strategy that depends on the ability to act on the oxygen supply device.

The first approach consists in reducing the aeration time in the subphase B8 as illustrated in FIG. 4; that is to say to stop the supply of oxygen into the aeration basin when the [amount of oxygen supplied/amount of pollution to be eliminated] ratio is highest, so as to supply oxygen preferentially in the subphases B6 and B7, during which periods the energy consumed by the aeration means is best used. The peak of the curved segment A3m in FIG. 4 corresponds to the fixed dissolved-oxygen maximum threshold Max. O$_2$ and is located at a lower level than in FIG. 3.

According to the invention, as may be seen in FIG. 4, the duration of the subphase B8 is shorter than that of the conventional process of FIG. 3 so that the duration D4 of the aeration phase is reduced by an amount L4. The aeration will be shorter and more frequent.

However, in order not to degrade the quality of the sludge, in particular its capability of settling and of being dehydrated, and to check that the oxygen supply is not a factor limiting the nitrification, measures may be taken to ensure that the dissolved-oxygen measurement does reach, point wise, at each cycle, a value at least equal to a threshold of around 1 to 2 mg/l, this being denoted by Max. $O_2$ in FIG. 4.

According to the invention, the supply of oxygen into the aeration basin is therefore stopped if one of the following conditions is satisfied:

the rate of decrease of the ammoniacal nitrogen measurement is below a minimum threshold value, in particular 0.5 mg/l/h after a certain time and the dissolved-oxygen measurement is above a high threshold Max. $O_2$, especially about 1.5 mg/l; or the overall nitrogen content, that is to say the sum of the ammoniacal nitrogen and nitrate measurements exceeds a high threshold, determined according to the treatment guarantees, for example 10 mg ($N-NH_4+N-NO_3$)/l.

A time delay is also provided for each of the triggering events. Thus, in the absence of a dissolved-oxygen measurement, or if the probe 4a is faulty, the supply of oxygen will be stopped at a certain time, especially about 10 minutes after the condition relating to the decrease in ammoniacal nitrogen measurement has been satisfied.

The plant according to the invention comprises programmable control means C (FIG. 1), especially a controller, connected to the sensors 4a, 4b and 4c and capable of controlling a solenoid valve V that controls the flow of oxygen supplied to the injectors 3. The solenoid valve V may be replaced by an air booster.

When the oxygen supply device can be modulated, for example by having a possibility of varying the flow of air injected into the aeration basin, it is then advantageous to reduce this oxygen supply in the subphase B8. This is because the amount of oxygen to be injected in the phases B6 and B7 essentially depends on the rate of nitrification according to parameters such as the amount of nitrifying bacteria and the temperature, whereas in phase B8 this amount of oxygen is directly dependent on the amount of pollution entering the aeration basin.

Now, this amount of incoming pollution is in direct relationship with the rate of rise of the ammoniacal nitrogen measurement B10a1 during the preceding anoxia phase B10, without it being necessary to measure this directly in the raw water.

According to the invention, if the oxygen supply device can be modulated, then, when the downward slope of the ammoniacal nitrogen measurement is below the low threshold, especially 0.5 mg $N-NH_4$/l/h, the amount of oxygen injected into the aeration basin will be proportional to the rate of rise of the ammoniacal nitrogen measurement during all or part of the preceding anoxia phase. The coefficient of proportionality can be adjusted by the operator according to the characteristics of the equipment.

The supply of oxygen is stopped when the sum of the ammoniacal nitrogen and nitrate measurements is greater than a high threshold or after a certain adjustable time.

In FIGS. 5 and 6, the period D4' corresponds to a period of air supply with an adjustable flow rate. The full height of the rectangle representing the period D4' corresponds to the nominal aeration air flow of the plant. The zone L4' corresponds to that part of the cycle where oxygenation is reduced, without being eliminated. The height of the zone L4' represents the reduction in the air flow.

FIG. 5 corresponds to a period of high incoming pollution: air is supplied during the subphases B6 and B7 at the nominal flow rate D4' until the downward slope of $N-NH_4$ reaches the low threshold, after which the rate of oxygenation in the subphase B8 is reduced from the value corresponding to the height of L4' until the end of B8, the reduction being calculated according to the upward slope of A1m of the ammoniacal nitrogen content (incoming pollution) during the preceding subphase B10.

According to the invention, if the oxygen supply device can be modulated throughout the duration of the aeration phase, in particular in an under-load period of the station, the amount of oxygen injected into the aeration basin is proportional to the rate of rise of the ammoniacal nitrogen measurement over all or part of the preceding anoxia phase.

The oxygen supply is stopped when the sum of the ammoniacal nitrogen and nitrate measurements is above a high threshold or after a certain time.

FIG. 6 corresponds to a period of low incoming pollution (for example at night): during the aeration subphases B6 to B8, the plant is supplied at a rate of oxygenation reduced by the height of the zone L4', the reduction being calculated according to the slope A1m (incoming pollution or charge) during the preceding subphase B10.

The invention makes it possible:

to ensure that the ammoniacal nitrogen is eliminated, by direct measurement of $N-NH_4$;

to ensure that all the nitrogen is eliminated controlled by the sum of the $N-NO_3+N-NH_4$ measurements;

to optimize the consumed energy, by limiting the aeration to periods of better efficiency; and to avoid any drift in the $NH_4$ and $NO_3$ sensors near the zero value by detecting thresholds for reductions in the measurements instead of low thresholds for the measurements themselves.

The invention claimed is:

1. A method of regulating the oxygen supply into a basin for the biological treatment of wastewater by alternating aeration comprising successive cycles, each cycle comprising an aeration first phase, for oxidizing especially the carbon and nitrogen compounds using aerobic bacteria, and an anoxic second phase, for reducing the nitrites and nitrates formed during the preceding aeration phase, the method comprising:

providing at least one ammoniacal nitrogen measurement sensor and one nitrate measurement sensor in one of the liquor of the basin or in the liquor that leaves the basin;

actuating, a supply of oxygen in the aeration phase on the basis of the following operating event:

the rate of decrease of the nitrate measurement drops below a low threshold; and stopping the supply of oxygen in the aeration phase when at least one of the following triggering events occurs:

the rate of decrease of the ammoniacal nitrogen measurement drops below a low threshold; and the sum of the ammoniacal nitrogen and nitrate measurements exceeds a high threshold.

2. The method as claimed in claim 1, comprising:

providing, in addition to the ammoniacal nitrogen and nitrate measurement sensors, at least one dissolved-oxygen measurement sensor; and stopping the supply of oxygen in the aeration phase when at least one of the following triggering events occurs:

the rate of decrease of ammoniacal nitrogen measurement drops below a low threshold and the dissolved-oxygen measurement exceeds a high threshold; and the sum of the ammoniacal and nitrate measurements exceeds a high threshold.

3. The method as claimed in claim 1, wherein the low threshold for the rate of decrease of the nitrate measurement controlling the onset of oxygen supply into the aeration basin is less than 1 mg/l/h.

4. The method as claimed in claim 1, wherein the low threshold for the rate of decrease of ammoniacal nitrogen is less than 1 mg/l/h.

5. The method as claimed in claim 1, wherein the triggering or operating events are delayed in such a way that if the threshold corresponding to an event is violated after a certain time, the oxygen supply is stopped or actuated without any other condition.

6. The method as claimed in claim 1, wherein the amount of oxygen supplied into the aeration basin during the nitrification phase is determined according to the ammoniacal nitrogen and/or nitrate measurements, in particular a threshold violation or a change of slope of the representative curve.

7. The method as claimed in claim 1, wherein the amount of oxygen supplied into the aeration basin during a nitrification phase is determined according to the rate of rise of the ammoniacal nitrogen measurement over all or part of the preceding anoxic phase.

8. A plant comprising:
a basin for the biological treatment of wastewater by alternating aeration with successive cycles, each cycle comprising an aeration first phase and an anoxic second phase;
at least one ammoniacal nitrogen measurement sensor and one nitrate sensor of the liquor in the basin or outside the basin;
an oxygen supply for supplying, oxygen to the basin;
an oxygen supply controller operably connected to the sensors and to the oxygen supply, the controller configured to:
turn on the oxygen supply in the aeration phase on the basis of the following operating event:
the rate of decrease of the nitrate measurement drops below a low threshold; and
stop the supply of oxygen in the aeration phase when at least one of the following triggering events occurs:
the rate of decrease of the ammoniacal nitrogen measurement drops below a low threshold; and
the sum of the ammoniacal nitrogen and nitrate measurements exceeds a high threshold.

9. The plant as claimed in claim 8, further comprising:
at least one dissolved-oxygen measurement sensor (4*a*); and wherein
the oxygen supply controller is connected to the sensors in order to stop the supply of oxygen in the aeration phase when at least one of the following triggering events occurs:
the rate of decrease of the ammoniacal nitrogen measurement drops below a low threshold and the dissolved-oxygen measurement exceeds a high threshold;
the sum of the ammoniacal nitrogen and nitrate measurements exceeds a high threshold.

10. The plant as claimed in claim 8, wherein the ammoniacal nitrogen measurement sensor and/or the nitrate sensor is/are placed in the aeration basin in order to measure the nitrogen compounds in the liquor of the aeration basin itself.

11. The plant as claimed in claim 8, wherein the ammoniacal nitrogen measurement and/or nitrate sensor is/are placed so as to measure the nitrogen compounds in the liquor leaving the aeration basin, before or after the settling/filtration unit, or in a specimen of the liquor taken from the aeration basin.

* * * * *